United States Patent [19]

Short

[11] 4,076,774
[45] Feb. 28, 1978

[54] DUAL-WALLED MICROCAPSULES AND A METHOD OF FORMING SAME

[75] Inventor: William T. Short, Warren, Mich.

[73] Assignee: General Motors Corporation, Detroit, Mich.

[21] Appl. No.: 662,027

[22] Filed: Feb. 27, 1976

[51] Int. Cl.² .............................................. B01J 13/02
[52] U.S. Cl. ....................................... 264/4; 252/316
[58] Field of Search ............................. 264/4; 252/316

[56] References Cited

U.S. PATENT DOCUMENTS

| 2,586,995 | 2/1952 | Robertson | 260/192 |
|---|---|---|---|
| 2,969,331 | 1/1961 | Brynko et al. | 252/316 |
| 3,429,827 | 2/1969 | Ruus | 252/316 |
| 3,575,882 | 4/1971 | Vandegaer et al. | 264/4 |
| 3,577,515 | 5/1971 | Vandegaer | 264/4 |
| 3,578,605 | 5/1971 | Baxter | 252/316 |
| 3,796,669 | 3/1974 | Kiritani et al. | 252/316 |

FOREIGN PATENT DOCUMENTS

| 1,091,076 | 11/1967 | United Kingdom | 252/316 |
|---|---|---|---|
| 1,091,077 | 11/1967 | United Kingdom | 252/316 |
| 1,091,078 | 11/1967 | United Kingdom | 252/316 |

OTHER PUBLICATIONS

"Advances in Microencapsulation Techniques", Flinn et al., *Battelle Technical Review,* 1967, pp. 2–8.

*Primary Examiner*—Jeffery R. Thurlow
*Attorney, Agent, or Firm*—Jack I. Pulley

[57] ABSTRACT

In accordance with a preferred embodiment of this invention, an active agent, such as a catalyst or a cocatalyst, is encapsulated in a dual-walled microcapsule. Both walls of the microcapsule are polymerization reaction products and both are formed in one basic process. The active agent is initially dissolved in a slowly polymerizing liquid monomer mixture such as a solution of toluene diisocyanate and a polyoxyalkylene polyol. The "monomer solvent" and the active agent combination is selected so that the active agent is nonreactive but soluble in the liquid monomer and insoluble in the polymer formed therefrom. However, before the active agent precipitates, the solution is dispersed in a nonreactive medium and the outer polymeric wall is formed by vigorously stirring the dispersion and then adding a reactive polyfunctional monomer. This polyfunctional monomer, which preferably has two primary aliphatic amine functionalities in terminal or near terminal positions, such as ethylene diamine, quickly reacts with the isocyanate of the initial monomer solution, via an interfacial polymerization reaction, to form the outer polyurea wall around each bead in the dispersion. Then the active hydrogen functionalities of the urea groups on the inner surface of the outer wall react with a portion of the nonreacted isocyanate functionality to form a biuret linkage between the outer wall and either or both the polymerizing monomer solution and the inner polymer wall which is formed therefrom. This reaction effectively bonds the outer wall to the inner wall as it forms. As the polyurethane polymerization reaction continues, the active agent precipitates and migrates toward the center of the microcapsule, and is thereby isolated and protected by the dual-walled structure which has been formed in one basic operation.

4 Claims, 1 Drawing Figure

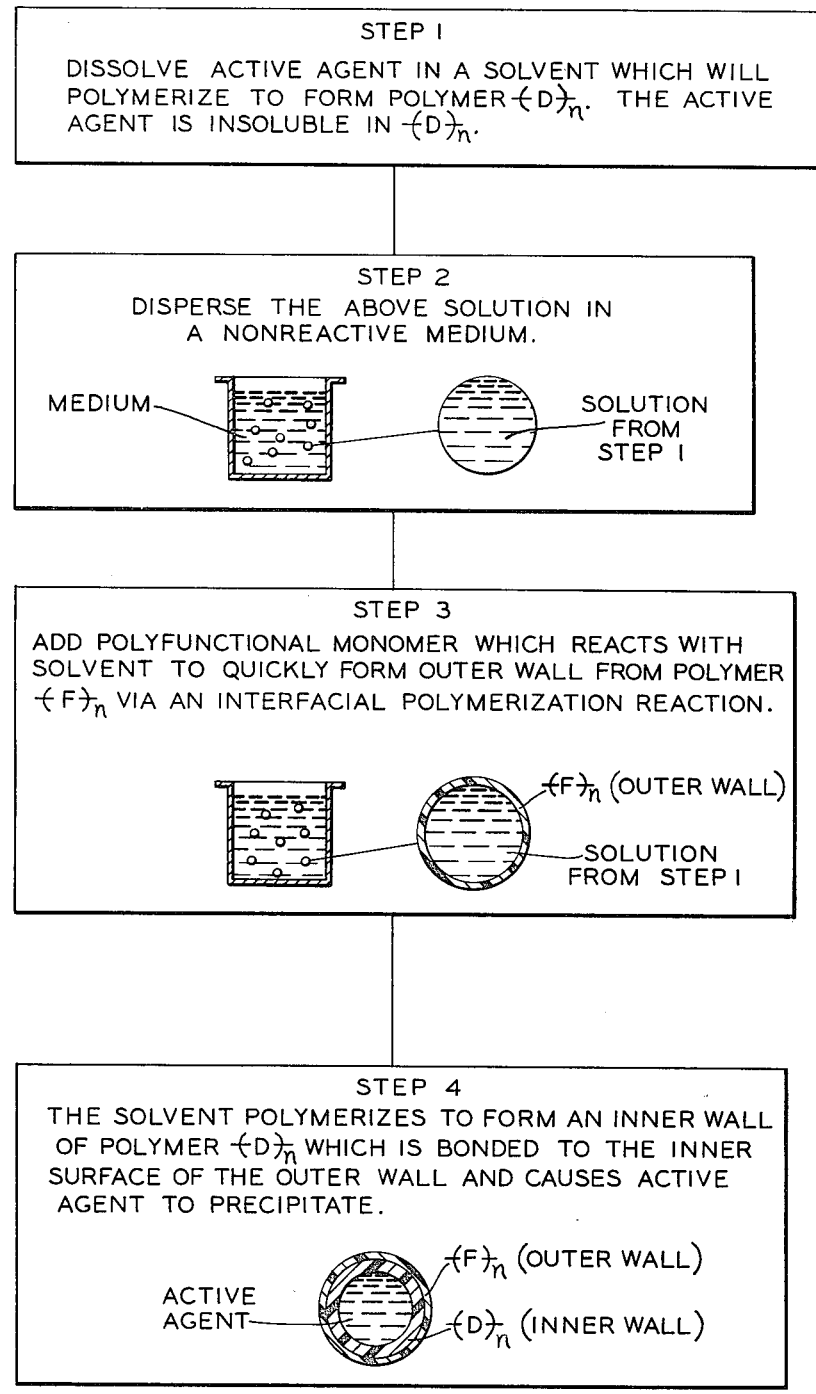

DUAL-WALLED MICROCAPSULES AND A METHOD OF FORMING SAME

FIELD OF THE INVENTION

This invention relates to dual-walled microcapsules and methods of forming same.

BACKGROUND OF THE INVENTION

The energy crisis has generated considerable interest in the area of latent catalysts which may be activated to cure a polymer composition without a considerable expenditure of heat. Coating applications have received a major portion of this interest.

One of several techniques which have been proposed in this area involves dispersing an encapsulated catalyst throughout the uncured polymer coating composition and then rupturing the catalyst as the coating composition is sprayed onto the substrate. Typically, the shear forces exerted on the coating composition as it passes through a spraying nozzle are sufficient to rupture the microcapsule and release the catalyst. Other applications which may employ an encapsulated component are pressure sensitive inks and adhesives, flame retardant additives, two-stage resins and the like.

The use of encapsulated catalysts, cocatalysts and the like has not been totally successful in coating applications because of the difficulty of economically producing a suitably leakproof microcapsule. This is an absolute requirement in producing a storage stable composition when a highly active catalyst is encapsulated and dispersed in a polymerizable composition. Typical interfacial polymerization or coacervation methods of encapsulating catalysts in single-walled microcapsules simply have not proved to be effective methods of producing storage stable compositions which are exposed to solvents.

In response to this problem, efforts have been directed at developing dual-walled microcapsules which would meet the substantially leakproof criteria. Typically, leaks occur through pinholes, and if two walls are used the pinholes in each wall must be aligned to cause a leak. To date, such efforts have employed a combination of the interfacial polymerization technique to form the inner wall and a coacervation technique to subsequently form the outer wall. The major drawback of these particular techniques is obvious -- two distinct processes are required to form a dual-walled microcapsule and each process contributes to the total cost.

OBJECTS OF THE INVENTION

An object provided by this invention is a single process for forming a substantially leakproof, dual-walled microcapsule wherein the outer wall is initially formed and encapsulates both the desired active agent and the reactants which subsequently form the inner wall and wherein each wall is formed by a distinct polymerization reaction and wherein the two walls are covalently bonded together.

A further object provided by this invention is a substantially leakproof, dual-walled microcapsule wherein the outer wall is formed before the inner wall and each wall is the product of a distinct polymerization reaction and wherein the walls are covalently bonded together.

An additional object provided by this invention is a substantially leakproof, dual-walled microcapsule having a polyurea outer wall and a polyurethane inner wall which is bonded to the inner surface of the outer wall by biuret linkages, and a method for making same.

SUMMARY OF THE INVENTION

The attached drawing is a flow diagram describing the basic steps in the subject process and illustrating the structure of the microcapsule at various stages in the process.

In accordance with a preferred embodiment, a liquid solution is formed and dispersed as very fine droplets or beads in a nonreactive liquid medium (see Steps 1 and 2 in flow diagram). The liquid solution contains the active agent, which in this preferred embodiment is a cocatalyst for addition type polymerization reactions, 4,4'-methylene-bis(N,N-dimethylaniline), as the solute and a polymerizable mixture of toluene diisocyanate and a polyoxyalkylene polyol as a solvent. The terms "solute" and "solvent" are used strictly for illustrative purposes and not to imply a limitation. The active agent is nonreactive and soluble in the liquid monomer solvent but insoluble in the polyurethane formed by the polymerization of the "monomer solvent" solution.

To form the outer wall the dispersion is vigorously stirred and a reactive polyfunctional monomer, preferably ethylene diamine and/or oligomers thereof such as tetraethylene pentamine, is rapidly added (see Step 3). The primary amine functionalities quickly react with a portion of the isocyanate to form a thin polyurea (polymer $-F-_n$) outer wall around each bead of the dispersion. The polymerizing "monomer solvent" continues to polymerize and form the polyurethane (polymer $-D-_n$) inner wall which is bonded through biuret linkages to the inner surface of the previously formed outer wall. As the "monomer solvent" polymerizes, the catalyst precipitates and migrates to the center of the microcapsule and is thereby encapsulated in a substantially leakproof, dual-walled structure (see Step 4).

By the subject process it is possible to economically encapsulate a catalyst for addition polymerization reactions, such as a free radical source (e.g., benzoyl peroxide or an azo-containing compound) or a cocatalyst, such as the aforementioned 4,4'-methylene-bis(N,N-dimethylaniline), in a substantially leakproof, dual-walled structure. The encapsulated and latent catalyst may then be dispersed in a monomer, such as one of the acrylics which polymerizes by a free radical mechanism and which is an excellent film forming ingredient in coating compositions. The storage-stable, monomer-catalyst dispersion may then be blended with other suitable coating ingredients and sprayed onto a substrate. Typically, the shear forces on the microcapsules as they pass through the nozzle will be sufficient to break the capsules and release the catalyst; however, it may be advantageous to employ a high shear nozzle to assure a uniform and complete release of the catalyst.

The encapsulating arts employ microcapsules in many applications and the subject dual-walled structures may be tailored for many of these uses.

DETAILED DESCRIPTION OF THE INVENTION

In accordance with the practice of this invention, these and other objects and advantages are achieved by initially forming a solution of the active agent (the solute) in a monomer or mixture of monomers (the solvent). The "monomer solvent" is selected from that group which will polymerize relatively slowly and form a solid polymer in which the active agent is insoluble. Since a major objective of this process is to isolate and protect the active agent, it must be substantially nonreactive and compatible with both the "monomer solvent" and the polymer solid. From this, it is apparent that the solvent and the solute must be selected in view of the properties of each and in view of the practitioner's final application.

The "monomer solvent" polymerizes to form the inner wall of the microcapsule; however, the outer wall must be formed first and the rate of polymerization of the monomer solvent must be sufficiently slow to allow the practitioner to form the outer wall. It would also be suitable to inhibit the "monomer solvent" polymerization until the outer wall has formed. From this it is evident that the suitable rate of polymerization will depend upon the parameters of the particular process employed by the practitioner.

Suitable candidates for the "monomer solvent" and the active agent may be evaluated by reviewing their properties in handbook tables of solubility and polymerization reaction rates. This evaluation should be conducted in view of a basic understanding of the particular time requirements of the practitioner's process and a basic understanding of what materials will be suitably compatible and mutually nonreactive.

A specific example of a suitable combination of materials would include an active agent, such as benzoyl peroxide which is a catalyst for addition type polymerization reactions, and a "monomer solvent" formed from toluene diisocyanate and a mixture of polyoxyalkylene diols and triols. In this particular combination, the benzoyl peroxide is soluble, but nonreactive, in the "monomer solvent" and is insoluble in the polyurethane solid formed by the polymerization of the diisocyanate and the polyols. The ratio of diol to triol will help determine the hardness and strength of the inner wall by dictating the degree of crosslinking therein. By regulating this ratio, the practitioner can, to some degree, control the toughness of the microcapsule in view of the particular shear characteristics of his spray nozzle or whatever other means he uses to rupture the microcapsules.

As the polyurethane solid forms, the benzoyl peroxide will precipitate. However, the polymerization rate of the polyols and the diisocyanate is sufficiently slow to allow the practitioner to form the outer wall of the microcapsule before a significant amount of benzoyl peroxide has precipitated from the polymerizing monomer solvent.

In fact, the polyol-diisocyanate polymerization is so slow that it is preferable to add an organometallic coordination catalyst to accelerate the reaction. By this technique, this reaction rate is easily regulated to meet the practitioner's needs.

Other examples of suitable active agents which may be encapsulated in the preferred urea-urethane dual-walled microcapsule include the azonitrile compounds such as those described in U.S. Pat. No. 2,586,995 and having the following structure:

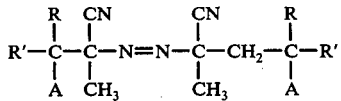

wherein R and R' are lower alkyl radicals having from 1 to 4 carbon atoms and A is a radical attached to the gamma carbon by a nonmetallic element having an atomic number of at least 6, e.g., oxygen, carbon and preferably from 6 to 8. The 2,586,995 patent is hereby incorporated by reference for the purpose of describing suitable active agents.

The second step in this process is to disperse the active agent-monomer solution in a nonreactive medium. Typically, this may be done in accordance with known techniques by rapidly stirring the initial solution into an immiscible and nonreactive liquid medium which contains an emulsifying quantity of surface active agent such as a nonionic surfactant. A suitably nonreactive medium for the preferred urea-urethane system is water.

The dispersion, which may also be termed an emulsion or a suspension, formed by this step is basically a relatively uniform mixture of small, substantially spherical beads, having a relatively uniform diameter which may range from about 10 microns or less to 500 microns or more, of the initial active agent-monomer solution suspended in the nonreactive liquid medium.

To form the outer wall of the microcapsule, the dispersion is vigorously stirred and a reactive polyfunctional monomer is rapidly added. This monomer is selected so as to quickly react at the surface of the beads with a functionality contained in the initial "monomer solvent" to form the polymeric outer wall.

This is a typical interfacial polymerization reaction which forms a thin outer wall which, in turn, isolates the wall forming reactants and stops the reaction. At this point, a single-walled microcapsule has been formed, and the microcapsule may be removed from the dispersing medium by any suitable separation process such as filtering or the like.

The outer wall of the microcapsule should be capable of presenting a reactive functionality to the more slowly polymerizing "monomer solvent" once the outer wall has been formed. This functionality, which is on the inner surface of the outer wall, reacts with the polymerizing "monomer solvent" to covalently bond the polymer and/or the polymerizing solvent mixture to the inner surface of the outer wall. This prevents the initial "monomer solvent" from polymerizing independently of the outer wall and perhaps forming an outer wall-active agent-inner wall structure. In other words, by this reaction the dual-walled structure is assured.

As mentioned above, a polyfunctional monomer which would be suitable for use in a process employing the toluene diisocyanate-polyol solvent is an aliphatic diamine such as ethylene diamine and/or its oligomers. In this particular reaction scheme, the primary amine functionality of the polyamine would react with the isocyanate functionality contained in the initial monomer solution to form a polyurea outer shell.

The urea, through its active hydrogen functionality, then proceeds to react with a portion of the unreacted isocyanate functionality in the "monomer solvent", to form a biuret linkage between the inner surface of the outer wall and the polymerizing "monomer solvent". Thereby the two walls are bonded together.

In this particular case, the inner wall is bonded to the inner surface of the outer wall by a reaction involving the urea functionality which is formed as the outer wall was formed. However, this is not the only method of providing a reactive functionality on the inner surface of the outer wall. For example, the polyfunctional monomer may carry a third distinct pendent functionality which will react with the polymerizing inner wall resin. For example, a polyfunctional monomer, such as ethanol diamine, has a pendent hydroxyl group which will react with the isocyanate of the inner wall forming monomer solution.

With reference to the attached flow chart, this invention may be more clearly understood in view of the two condensation polymerization reactions which form the two walls and the third reaction which covalently bonds the two walls together.

The first reaction ($R_1$) is a relatively fast interfacial condensation polymerization reaction which forms the outer wall of the microcapsule from polymer $(F)_n$. This reaction ($R_1$) occurs after the active agent-monomer solution has been dispersed in a nonreactive medium. In this dispersed state, the active agent-monomer solution is in the physical form of minute spheres or beads suspended in the medium. The first reaction ($R_1$) is initiated by adding a polyfunctional reactant to the dispersion as it is vigorously stirred. This reaction occurs at the surface of each bead, and is properly termed an interfacial polymerization since this surface is the interface between the active agent-monomer solution and the polyfunctional reactant which has been added to the medium. This reaction ($R_1$) seals each bead and forms the outer wall of the microcapsule. Once this wall is formed, the reaction ($R_1$) stops because the reactants are then separated by the wall itself.

It is emphasized that ($R_1$) is an interfacial condensation polymerization reaction between two reactants and that one of the reactants is in the initial active agent-monomer solution and the other reactant is in the dispersing medium. Furthermore, this first reaction should proceed quickly to seal the microcapsule before the polymerization reaction ($R_2$) of the "monomer solvent" proceeds far enough to cause a significant amount of the active agent to precipitate. It is to be noted that the rate of both reactions ($R_1$) and ($R_2$) may be controlled by conventional techniques such as controlling the temperature, the concentration of the reactants and by the use of catalysts.

The initial "monomer solvent" polymerizes via a second reaction ($R_2$) which is a relatively slow condensation reaction. This reaction ($R_2$) generates polymer $(D)_n$ and forms the inner wall of the microcapsule. This inner wall is formed after the first reaction ($R_1$) has formed the outer wall.

As the second reaction ($R_2$) generates the inner wall, the active agent precipitates and migrates to the center of the microcapsule, since the polymerizing "monomer solvent" and polymer $(D)_n$ formed therefrom are covalently bonded to the inner surface of the outer wall by a third reaction ($R_3$). The third reaction ($R_3$) involves a functionality on the inner surface of the outer wall and one or more of the reacting functionalities in the "monomer solvent".

In adjusting the polymerization parameters, the practitioner should realize that the rate of the second polymerization reaction ($R_2$) must be slow enough to allow him to: (1) add the active agent to the "monomer solvent" solution, (2) disperse the first solution in a nonreactive medium, and (3) add the third monomer reactant and thereby form the outer wall of the microcapsule before the solvent polymerizes appreciably.

If the second polymerization reaction proceeds too quickly, the active agent will precipitate before the outer wall is formed. This will prevent the formation of the dual-walled structure since the active agent will not migrate to the center of the bead but more probably to its surface. In view of this, it is evident that the monomer solute combination and the dispersing and polymerization parameters must be selected within the context of the time requirements of a specific process.

The three basic reactions will be more easily understood in view of a more detailed description of various suitable reactants which may be graphically illustrated as follows:

The capital letters designate the reactive functionalities.

| REACTANT I | A---A | Blended to form "monomer solvent" and subsequently polymerizes to form polymer $(D)_n$. |
|---|---|---|
| REACTANT II | B---B | |
| REACTANT III | C---C | Reacts with A and/or B to form polymer $(F)_n$. |

Reactants I and II are initially blended to form the initial "monomer solvent" which eventually polymerizes to form the inner wall from polymer $(D)_n$. The active agent is soluble in the "monomer solvent" but insoluble in polymer $(D)_n$.

Reactant III is added to a dispersion of the active agent-"monomer solvent" solution in a nonreactive medium and rapidly reacts with the A and/or the B functionality to form polymer $(F)_n$ around each bead of the dispersed solution; this reaction ($R_1$) forms the outer wall. Typically, the particular reactant in the initial monomer solvent which reacts with Reactant III is present in a molar excess with respect to the other initial monomer solvent reactant.

The covalent bonds between the inner and outer walls are formed by a reaction involving functionality A and/or B in the polymerizing "monomer solvent" and a reactive functionality ($Y_1$) which may be pendent to Reactant III (i.e., the hydroxyl group on ethanol diamine) or a reactive functionality formed by the reaction of C with A and/or B (i.e., the active hydrogen group on the urea linkage).

Various reactants may be used in this reaction scheme and three suitable sets will be described for illustrative purposes. These sets are: (1) the preferred urea-urethane set, (2) an epoxy-based set, and (3) an amide/ester set.

In the preferred urea-urethane set, Reactant I is suitably an aliphatic aromatic or alicyclic compound having at least two isocyanate groups in terminal or near terminal positions such as toluene diisocyanate (TDI) or diphenyl methane diisocyanate (MDI), and Reactant II is suitably an aliphatic, aromatic or alicyclic compound having at least two hydroxyl groups in terminal or near terminal positions such as polyoxyalkylene diol or triol or mixtures thereof. Reactant III, in this set, is suitably an aliphatic, aromatic or alicyclic polyamine or polyamine resin, which has at least two primary amine functionalities in terminal or near terminal positions such as ethylene diamine and/or oligomers thereof.

In this preferred set, functionality A would be the isocyanate (NCO) functionality, functionality B would be the hydroxyl (OH), and C would be the primary amine. The diisocyanate (NCO) and the polyol (OH) are initially blended and eventually react to form a polyurethane, which forms the inner wall, and is designated polymer $(D)_n$. The amine ($NH_2$) reacts with the isocyanate (NCO) to form the outer wall of polymer $(F)_n$, which is a polyurea. The bond, in this particular set, between the two walls is a biuret linkage formed as the active hydrogen on the urea group on the inner surface of the outer wall reacts with the isocyanate functionality in the polymerizing monomer solution.

The diisocyanate-containing reactant should be present in a molar excess of the polyol since the isocyanate must participate in the formation of the inner and outer walls of the microcapsule and also react with the urea.

To summarize, this set of compounds will form a polyurea (polymer $-(F)_n-$) outer wall and a polyurethane (polymer $-(D)_n-$) inner wall and biuret linkages bonding the two walls together. The polymerization parameters for this and the other two sets of reactants, such as pressure, temperature, reactant and catalyst type and concentrations, may be varied within the conventional ranges to fit the practitioner's specific needs. These ranges may be found in any of several handbooks such as "Polymers Handbook" by Brandrup and Immergut, which was published by Interscience in 1966.

Suitable active agents which may be encapsulated via the subject invention in the urea-urethane set include those aliphatic, alicyclic, aromatic organic compounds having a linkage or a pendent functionality such as a peroxide, an hydroperoxide, an azo functionality or a hindered amine. This would also include the coordination catalysts typically used to catalyze the polymerization of urethane forming reactions such as organo tin salts, the cobalt naphthenate compounds, and the zinc salts and the like. The latter group of compounds would be suitable even though they catalyze the polymerization reaction between the isocyanate and the polyol as long as this rate of reaction is not accelerated to such a rate as to preclude practitioner from forming the first solution, dispersing said first solution in a medium, and then forming the outer wall.

More generally, any active agent may be suitably encapsulated by this invention as long as that active agent does not contain a functionality which readily reacts with either the isocyanate or hydroxyl functionality within the same time reference as the urethane forming reaction. Such active agents must be excluded from the scope of the invention as such a reaction would interfere with the formation of the inner wall. However, it is to be noted that such reactions may occur as long as these reactions occur so slowly as to not interfere with the formation of the inner wall and do not significantly affect the nature of the active agent.

In the epoxy set of reactants, which may be used within the practice of this invention, the first reactant is an aliphatic, aromatic or alicyclic epoxy compound wherein the epoxy groups are in terminal or near terminal positions. The second reactant in this set is an aliphatic, aromatic or alicyclic polyacid or analog thereof or a polyol, wherein two of these functionalities are in terminal or near terminal position. The first two reactants are blended to form the initial "monomer solvent" into which the active agent is dissolved to form the first solution. This first solution is then dispersed in a nonreactive medium and a third reactant which may be an aliphatic, alicyclic or aromatic compound having at least two primary amine functionalities in terminal or near terminal position is added as the dispersion is vigorously stirred; anhydride functionalities may be substituted for the primary amines.

In this set, the epoxy reactant is added in excess, since it will react with either the polyacid or polyol reactant to form either a polyester or polyether inner wall and also react with the polyamine or polyanhydride reactant to form the outer wall and to bond the inner wall to the outer wall.

Suitable active agents which may be encapsulated in the epoxy set include those aliphatic, alicyclic and aromatic catalysts and cocatalysts having a linkage or pendent functionality such as a peroxide, an hydroperoxide, an azo functionality or a hindered amine. As with the urea-urethane set, this set may also be used to encapsulate the organo-metal salt coordination type catalysts typically used in the polymerization of polyurethanes. In general, the epoxy set may be used to encapsulate any compound which does not contain functionalities that readily react with either the epoxy, the acid or the hydroxyl functionalities within the time reference of the polyester or polyether forming reactions. Functionalities which should specifically be avoided in the epoxy set include acids, hydroxyls and primary and secondary amines.

A third suitable set of reactants produces a polyamide outer wall and a polyester inner wall which are linked through amide functionalities. In this set, the first reactant is an aliphatic, alicyclic or aromatic organic compound having at least two acid halide functionalities in terminal or near terminal positions. The second reactant is an aliphatic, alicyclic or aromatic polyol having at least two hydroxyl functionalities in terminal or near terminal positions. These two reactants are blended to form the initial liquid "monomer solvent", into which the active agent is dissolved and which eventually polymerize to form a polyester inner wall. After the active agent-polyacid-polyol solution is dispersed in a nonreactive medium, a third reactant is added. This is suitably an aliphatic, aromatic or alicyclic polyamine which contains at least two primary amine functionalities positioned in terminal or near terminal positions.

The third reactant reacts with the first reactant present on the surface of the dispersed first solution beads to quickly form a polyamide outer shell. However, in this reaction an amine or mixture of amines having an average of more than two amine functionalities per molecule is used so that once the polyamide outer shell has been formed there are still amine functionalities presented on the inner surface of the outer wall to react with the acid halide functionalities present in the polymerizing first solution to effectively bond the polyester inner wall to the inner surface of the outer wall. In this set of reactants, the diacid reactant is present in sufficient molar excess over the polyol to provide reaction cites for both the forming of the outer wall on the surface of the dispersed beads and for the formation of the amide linkages between the inner and outer walls.

EXAMPLE

In accordance with the practice of this invention a dual-walled microcapsule was formed around an aniline type compound which is useful as a cocatalyst in vinyl polymerization reactions. This dual-wall microcapsule structure did not require separate and distinct processes to form each individual wall, as has been required with prior art techniques. All steps were carried out at or near room temperature and atmosphere pressure.

The first step in this operation was to dissolve 24 grams of a polyoxypropylene triol having a number average molecular weight (Mn) of about 1,500 in about 10 grams of toluene diisocyanate. The triol used in this example is marketed by BASF:Wyandotte Chemical Corporation under the trade name TP1540; this product is part of that company's Pluracol series. The toluene diisocyanate used in this example is marketed by the E. I. Du Pont de Nemours and Company under the trade name Hylene T. About 0.1% dibutyl tin dilaurate was added to catalyze the polyurethane forming reaction;

however, seven hours was still required to form the inner wall.

The next step was to dissolve in the solution formed above about 5 grams of the aniline active agent; this aniline is marketed by the Eastman Chemical Company under the name 4,4'-methylene-bis(N,N-dimethylaniline). This is a tertiary amine which also reacts with the isocyanate, but very slowly; therefore, there was little concern about this side reaction.

The next step was to disperse or emulsify the aniline solution formed above in about 500 milliliters of distilled water, which for these particular solutes in substantially an inert medium. The dispersion or emulsification process was facilitated by the addition of about one percent by weight of a nonionic surfactant; this material is marketed by the E. I. Du Pont de Nemours and Company under the trade name DePonol-Me. Since the dispersing medium, water, and the aniline-containing solution are mutually immiscible, the emulsification step in effect created minute, substantially spherical beads of the aniline-toluene diisocyanate-polyol solution dispersed throughout the water.

The next step was to vigorously stir the dispersion and simultaneously add about 50 milliliters of ethylene diamine; this compound is manufactured by the Eastman Chemical Corporation and marketed under its generic name. This is a primary amine which dissolves in the water and reacts very quickly with the isocyanate at the surface of the beads to form a polyurea shell which completely surrounds and seals each bead. At this point, it should be noted that the reaction between the primary amine and the isocyanate occurs only at the interface between the primary amine-water solution and the aniline-toluene diisocyanate-polyol solution which is dispersed therein. Therefore, the reaction does not consume all the amine or all the isocyanate, because once the wall has formed the primary amine is no longer in contact with the isocyanate and therefore the reaction stops. Typically, the outer wall forms within a minute.

Urea functionalities are present on the inner surface of the outer wall and are thereby presented inwardly toward the slowly reacting polyol-diisocyanate solution in which the aniline is dissolved. The urea functionality contains an active hydrogen group which reacts with the isocyanate to form a biuret linkage which effectively bonds the slowly polymerizing polyol-diisocyanate solution to the inner surface of the outer wall. Therefore, as this polymerization reaction continues, the urethane is formed against the inner surface of the outer wall. At this point, it is to be noted that the aniline compound is precipitating from the polymerizing polyol-diisocyanate solution. This order of events is the result of selecting the components of the initial "monomer solvent" so that they react slowly and allow the outer shell to be formed before they polymerize to a point which may cause the aniline to precipitate.

These results were substantiated by a direct microscopic examination of the microcapsules immediately after the outer polyurea shell had been formed and at various times afterwards as the inner wall was forming. This examination was conducted by rupturing the shells and then examining the rubble under a microscope. The first observation clearly indicated that a single-walled microcapsule had been formed. However, as the observations continued, the dual-walled structure appeared. From this it was evident that the polyol-diisocyanate solution had polymerized and formed the second wall against the inner surface of the outer wall and caused the aniline compound to precipitate and migrate towards the center of the microcapsule. The dual-walled structure indicated that the inner wall was bonded to the outer wall. Without this bond the "monomer solvent" would probably form a ball and exude the active agent rather than form an inner wall. This process had formed a substantially leakproof, hard microcapsule which would be very suitable for isolating various highly reactive materials.

The encapsulated aniline was then blended into an acrylic monomer and the capsules were ruptured as the monomer was applied as a coating. The curing characteristics of the coating clearly indicated that the aniline was present and active.

While my invention has been described in terms of certain specific embodiments, it will be appreciated that other forms thereof could readily be adapted by one skilled in the art. Therefore, the scope of my invention is not to be limited to the specific embodiments disclosed.

What is claimed is:

1. A method of encapsulating an active agent in a dual-walled microcapsule, said method comprising the steps of:
    a. forming a liquid dispersion of beads of a first solution uniformly dispersed throughout a substantially nonreactive medium, said first solution comprising: a polymerizing monomer or mixture of monomers as the solvent which monomers or mixture of monomers polymerize via a condensation mechanism and dissolved therein said active agent, which is compatible with and nonreactive in said monomer solvent and is insoluble in the polymer formed by the polymerization of said monomer solvent; then before said active agent has precipitated;
    b. forming a polymeric outer wall around said beads by vigorously stirring said dispersion and simultaneously adding a polyfunctional monomer which rapidly reacts with said solvent monomer at the surface of said beads via an interfacial polymerization reaction to quickly form said polymeric outer wall around each bead, and which outer wall polymer then presents inwardly to the polymerizing monomer solution a functionality which reacts with said polymerizing monomer solvent to covalently bond said polymerizing monomer solvent and/or polymer formed therefrom to the inner surface of said outer wall, said monomer solvent continuing to polymerize and form a solid polymeric second wall against the inner surface of said first wall and causing the active agent to precipitate and migrate towards the center of the microcapsule, said active agent being thereby encapsulated in a dual-walled microcapsule.

2. A method of encapsulating an active agent in a substantially leakproof, dual-walled microcapsule wherein the outer wall is formed before the inner wall and wherein both walls are products of separate condensation reactions and are covalently bonded together, said method comprising the steps of:
    a. forming a first liquid solution of difunctional monomers which polymerize via a condensation reaction and in which the active agent is nonreactive and soluble amd which monomers polymerize to form a solid in which the active agent is nonreactive and insoluble and then before said active agent has precipitated;

b. dissolving the active agent in said first monomer solution and thereby forming a second liquid solution in which the first monomer solution is the solvent and the active agent is the solute;

c. dispersing said second liquid solution in a nonreactive liquid medium which is substantially immiscible with said second solution and thereby forming small beads of said second solution dispersed throughout said medium; and d. forming a polymeric outer wall around said bead by vigorously stirring said dispersion and simultaneously adding a polyfunctional monomer which rapidly reacts with one of said monomers at the surface of said beads via an interfacial polymerization reaction to form a polymeric outer wall around each bead, and which outer wall polymer presents inwardly to the polymerizing first monomer solution a functionality which reacts with one or both of said first solution monomers to covalently bond said polymerizing first solution and/or polymer formed therefrom to the inner surface of said outer wall, then as said first solution continues to polymerize and form a solid second wall against the inner surface of said first wall, the active agent precipitates and migrates toward the center of the microcapsule, and is thereby encapsulated in a substantially leakproof, dual-walled microcapsule.

3. A method of encapsulating an active agent which does not readily react with water in a substantially leakproof, dual-walled microcapsule wherein the outer wall is formed before the inner wall and wherein both walls are condensation polymerization reaction products covalently bonded together, said method comprising the steps of:

a. forming a first liquid monomer solution of an aliphatic or aromatic or alicyclic diisocyanate and a polyoxyalkylene polyol in which the active agent is nonreactive and soluble, but which monomers polymerize to form a polyurethane solid in which the active agent is nonreactive and insoluble;

b. dissolving the active agent in said first monomer solution and thereby forming a second liquid solution;

c. dispersing said second liquid solution in water and thereby forming substantially spherical beads of said second solution dispersed throughout the water; and d. forming a polymeric outer wall around each bead by vigorously stirring said dispersion and simultaneously adding an aliphatic reactant having at least two primary amine functionalities, which amine functionalities rapidly react with the isocyanate functionalities at the surface of the beads via an interfacial polymerization reaction to form a polyurea outer wall around each bead, and which outer wall then presents inwardly to the polymerizing first monomer solution urea functionalities which react with the isocyanate functionalities in the second solution to form a biuret linkage between the polyurea outer shell and the polymerizing second solution and/or polymer formed therefrom, which second solution continues to polymerize and form a solid second wall against the inner surface of said first wall, and causes the active agent to precipitate from solution and migrate toward the center of the microcapsule and is thereby encapsulated in a substantially leakproof, dual-walled microcapsule.

4. A method of encapsulating an active agent which does not readily react with water in a substantially leakproof, dual-walled microcapsule wherein the outer wall is formed before the inner wall and wherein both walls are condensation polymerization reaction products, said method comprising the steps of:

a. forming a first liquid monomer solution of toluene diisocyanate and polyoxyalkylene polyols, in which first solution the active agent is nonreactive but soluble and which solution polymerizes to form a polyurethane solid in which the active agent is insoluble, there being an excess of said diisocyanate with respect to said polyols on a chemically equivalent basis;

b. dissolving the active agent in said first monomer solution and thereby forming a second liquid solution;

c. dispersing said second liquid solution in water and thereby forming beads of said second solution dispersed throughout the water; and d. forming a polymeric wall around said beads by vigorously stirring said dispersion and simultaneously adding an aliphatic reactant having at least two primary amine functionalities, which amine functionalities react with the isocyanate functionalities at the surface of the beads via an interfacial polymerization reaction to form a polyurea outer wall around each bead, and which outer wall then presents inwardly to the polymerizing first monomer solution a urea functionality which reacts with the isocyanate to form a biuret linkage between the urea outer shell and the polymerizing first solution and/or polymer formed therefrom and which second solution continues to polymerize and form a solid polyurethane wall against the inner surface of said first wall, and thereby causing the active agent to precipitate from solution and migrate toward the center of the microcapsule and thereby effectively encapsulating the active agent in a substantially leakproof, dual-walled microcapsule.

* * * * *